Sept. 10, 1957  E. BECKER ET AL  2,805,851

TEMPERATURE REGULATING MEANS FOR FURNACES

Filed May 18, 1954  3 Sheets-Sheet 1

INVENTORS:
ERNST BECKER AND
BORIS KAHL
BY

INVENTORS:
ERNST BECKER AND
BORIS KAHL
BY

INVENTORS:
ERNST BECKER AND
BORIS KAHL

United States Patent Office 2,805,851
Patented Sept. 10, 1957

2,805,851
TEMPERATURE REGULATING MEANS FOR FURNACES

Ernst Becker and Boris Kahl, Gummersbach, Rhineland, Germany

Application May 18, 1954, Serial No. 430,715
Claims priority, application Germany 23, 1953
8 Claims. (Cl. 266—32)

The present invention relates to temperature regulating means for furnaces. More particularly, the present invention relates to a cooling apparatus for cooling the melting zone of furnaces such as cupolas in such manner as to provide the desired temperature of the furnace wall in the melting zone.

It has been previously known to cool the melting zone of cupola furnaces in various ways, as for example by wetting the furnace wall. In the known methods and devices, however, it has been found that the consumption of cooling water is comparatively high, and, further, no means have been provided in the known devices of controlling within the necessary limits the temperature to which the melting zone should be cooled.

It is an object, therefore, of the present invention to overcome the above disadvantages in cooling arrangements for furnaces of the above type.

It is another object of the present invention to provide a cooling means for furnaces of the above type for satisfactorily controlling the temperature of the melting zone thereof.

It is still another object of the present invention to provide an improved arrangement of cooling elements in the wall of a furnace.

Other objects and advantages will become apparent from the following description and the appended claims.

With the above objects in view, the present invention mainly consists in a temperature control apparatus for furnaces which comprises, in combination, a furnace wall portion having an inner surface, cooling means in the furnace wall portion extending along the inner surface thereof, the cooling means being adapted to contain cooling fluid to which the heat of the furnace wall portion is transferred, conduit means for conducting cooling fluid to and from the cooling means, and regulating means for circulating cooling fluid through the cooling means via the conduit means with the cooling fluid at a predetermined pressure for maintaining the cooling fluid in the cooling means at a predetermined temperature.

In accordance with the invention, the cooling liquid which is preferably water is circulated in or forced through cooling elements fitted in the melting zone of the furnace, the regulation of the temperature being effected by maintaining the cooling medium under pressure by suitable known devices, such as check valves, so that by adjustment of the excess pressure between one atmosphere and any other suitable pressure, the desired cooling temperature is obtained. For example, if water is used as the cooling medium with a pressure of one atmosphere in the cooling elements, a temperature of 100° C. can be maintained constant, while by setting the pressure at 140 atmospheres corresponding to the temperature of evaporation in the cooling elements the temperature of 335° C. is obtained. Metals of low melting point, e. g., sodium or potassium or alloys thereof, can be used as the cooling medium. Temperatures obtained this way in the cooling elements result in a much greater life of the lining material, than in all previously known water cooling systems without pressure and therefor with lower temperatures in the elements, by which the lining is cooled down so much that the lining—especially if basic—becomes brittle. Furthermore, by using higher temperatures metallurgical advantages are obtained, such as for instance lower sulphur absorption by the liquid iron, lower silicon losses etc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
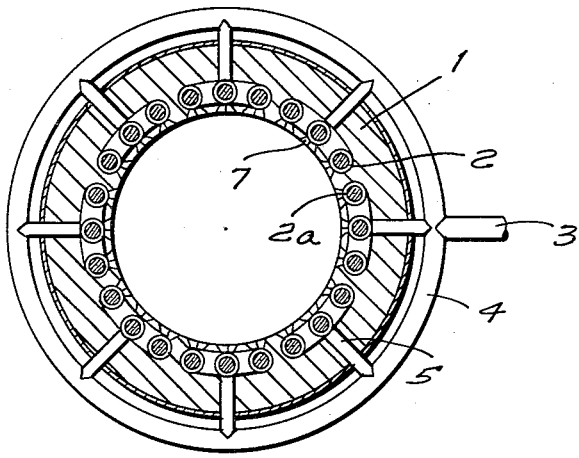
Fig. 1 is a horizontal section through the melting zone of a cupola furnace.
Figure 2:
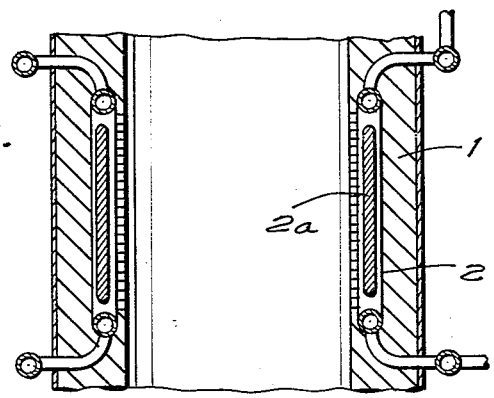
Fig. 2 is a vertical longitudinal section through the melting zone.

Referring now to the drawings, and particularly to Figs. 1 and 2, there is shown a cupola furnace wall 1 which is in the region of the melting zone of the furnace. Arranged within wall 1 are cooling tubes 2 extending around the inner surface of wall 1 spaced from each other. In the embodiment shown, the cooling tubes 2 are arranged in groups of three tubes with the tubes in each group interconnected with each other. Each set of three tubes 2 forms a cooling group which is supplied with cooling medium from the distributing annular conduit 4 via the connecting branches 5. The cooling medium is led through conduit 3 to be delivered to the conduit 4.

Figure 3:
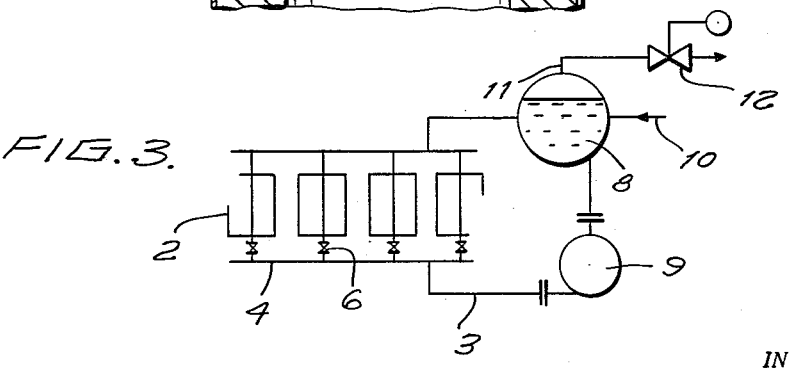
Fig. 3 is a diagrammatic view illustrating a form of cooling arrangement in accordance with the invention.

Within each cooling tube 2 there is arranged a spacer or constricting member 2a, which serves to provide a maximum speed of flow of the cooling medium in the neighborhood of the melting zone. In branches 5, as more clearly shown in Fig. 3, valves 6 are provided in order to insure a uniform distribution of the cooling medium to the separate groups.

The individual cooling tubes 2 are provided on the inside of the cupola with studs 7 to which is applied refractory material. In the course of operation of the furnace, this refractory material wears away and a layer of slag is built up in its place due to cooling. The advantage thereby obtained is that a cupola so cooled can, by simple alteration of the composition of the charge, be operated either basic or acid.

The evaporation of the cooling medium takes place in the drum 8 which may contain steam and water, while the circulation of the cooling medium is effected by a pump 9. Feed pipe 10 supplies cooling medium to the drum 8, while the outlet 11 removes the steam from the drum.

In the case where a liquid cooling medium is used, the wall temperature of the melting zone of the furnace may be regulated in accordance with the invention by adjusting valve 12 to provide a suitable pressure in the system.

It is a particular advantage of the described arrangement and method that the cooling elements of other devices of the installation can be connected either at the same time or subsequently to the installations for cooling the melting zone. This applies also, for example, to cooling elements for throttle valves, shut-off valves and like devices in which there is a forced flow of the cooling medium through the cooling elements. Also, devices for further utilization of the latent and sensible heat contained in the waste gases from the furnace of the installation can be connected to this system.

The cooling arrangement described and the method of use thereof are not limited in their application to cupola furnaces but they can be applied also to other shaft furnaces for similar purposes.

Where it is not desired to use a liquid cooling medium, a gaseous medium, e. g., air, can also be forced through the cooling elements, the air thereby heated being adapted to be utilized in known manner. The temperature can be regulated in such cases by regulating the quantity of the gaseous medium flowing through the cooling elements, with the gaseous medium under suitable pressure.

Figure 4:
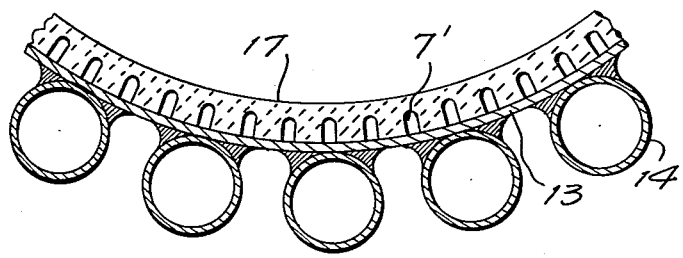
Fig. 4 is a horizontal section through part of a cupola shell showing an arrangement of cooling tubes.
Figure 5:
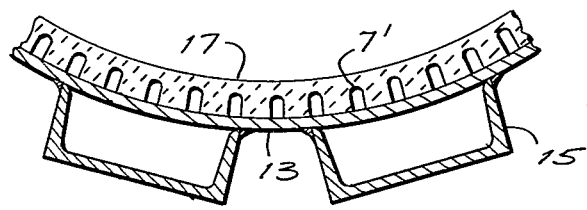
Fig. 5 is a horizontal section similar to Fig. 4 showing a different form of cooling tubes.
Figure 6:
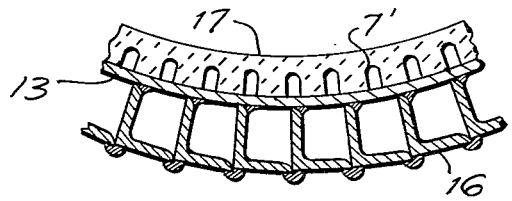
Fig. 6 is a similar section showing still another form of cooling elements.

Referring now to the arrangements shown in Figs. 4–6, there is shown in Fig. 4 a furnace shell 13 which is provided on the inside thereof with studs 7', and on the outside with cooling tubes 14, which may be spaced from each other as desired. The cooling tubes may be in the form of U-shaped members 15, as shown in Fig. 5, or may be constituted by angle irons 16 as shown in Fig. 6 which are welded together so as to form cooling members through which the cooling medium may pass.

The interior of the furnace is then coated with a refractory material in the normal manner before putting the furnace in operation. This refractory material in the course of operation of the furnace is melted off until a temperature balance is obtained and is then replaced by fluid slag which hardens in the sufficiently cool areas so that on the inside of the furnace a substantially smooth surface 17 is obtained on the refractory material or hardened slag.

The studs 7' serve to increase the adhesion of the layer of slag which forms thereon during operation of the furnace. When the cooling tubes are secured by welding, the heat-conducting cross section available for the transfer of heat from the interior of the furnace to the interior of the cooling elements may be very great. In addition to the forms of cooling elements already described, half round sections may also be used.

It is not necessary to use only straight cooling elements. For example, the cooling elements can be in the form of coils of tubes or in other forms and can be arranged so as to cool also the furnace shell adjacent the blast nozzles. The cooling tubes need not be welded to the furnace shell since they can be applied, for example, by the use of a good conducting cement or the like to the furnace shell and then provided on the outside with heat insulation.

It may be desirable not to make the cooled part of the furnace shaft, which may vary in extent as required, absolutely cylindrical, but to give it a form which takes into account the effect of the cooling elements in dependence on the temperature in different zones. In the hottest part of the melting zone, for example, the cooling elements have a relatively thin layer of slag, while in the colder region the layer of slag deposited is thicker. If an attempt is made to provide a completely cylindrical form of the useful cross section of the furnace, the cooling element or the cooled furnace shell should widen upwards somewhat conically in order, having regard to the thicker layer of slag at the upper end, to provide a uniform cylindrical form measured inside the layer of slag or the lining to be protected. The same conditions apply to the region beneath the melting zone.

The application of this measure is not limited to a furnace having cooling elements arranged on the outside of the furnace wall. It can be applied also to furnaces with cooling elements mounted inside the shell. The application of the cooling elements on the outside around a cylindrical shell is not limited to shaft furnaces for regulating the temperature of the melting zone but is generally applicable where coils of tubes or straight tubes were used heretofore internally, for example, in cooled furnace chambers.

Figure 8:
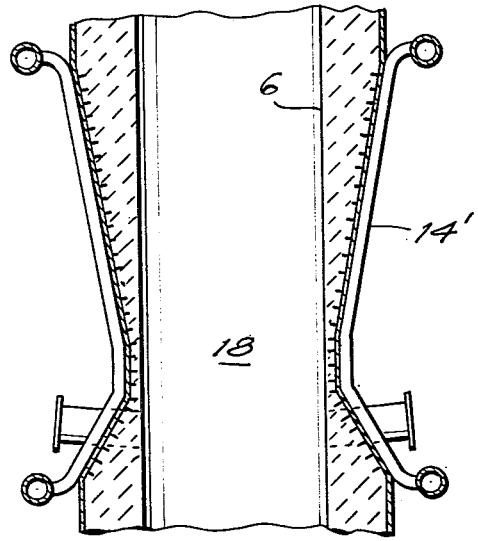
Fig. 8 is a vertical section through a cupola furnace having a cooled furnace shell portion of conical form.

Fig. 8 shows a vertical section through a cupola with a cooled furnace shell of conical form. As is apparent from this figure, due to the conical arrangement of the tubes 14' and the temperature gradient a cylindrical furnace space 18 is formed. If it is desired that the furnace chamber should not be cylindrical but should expand conically downwards, for example, to prevent the charges from remaining suspended in the furnace, the cooled surfaces are suitably shaped for this purpose.

Figure 7:
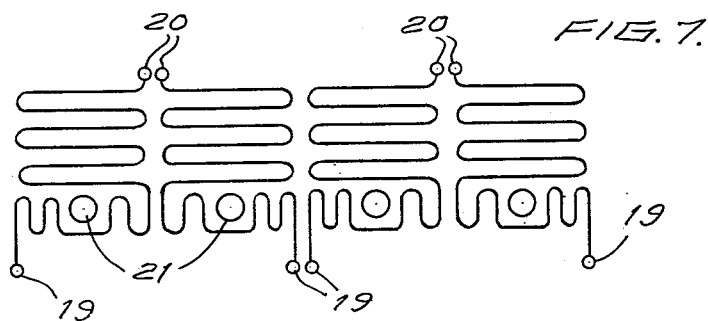
Fig. 7 is a diagrammatic view of an arrangement of cooling elements in the melting zone of a furnace shell.

In the arrangement shown in Fig. 7, the cooling medium enters the cooling elements at points 19 and leaves them at points 20, the inlet and exit points being connected in suitable manner to distributors, header tubes or chambers, with throttling devices or the like being provided in suitable manner to ensure uniform distribution of the cooling medium throughout the separate groups of tubes.

The cooling tubes can be so disposed as to cool or protect difficultly accessible parts. For example, the region around the air nozzles 21 can be protected satisfactorily, as indicated in the form shown in Fig. 7. In all cases it is desirable, though not absolutely necessary, in an arrangement such as shown in Fig. 7 to provide a positive flow or a positive circulation of the cooling medium through the steam-generating cooling device.

It is an advantage of the arrangements shown in Figs. 4–7 that furnaces which hitherto were not cooled or were merely cooled by previously known methods can be reconstructed at comparatively small cost and equipped with the cooling system of the present invention. Moreover, in accordance with the invention, a uniform temperature can be easily maintained in the cooling zone, and only a small quantity of water need be used in contrast to the comparatively large water requirements previously necessary, because in the present arrangement the heat of evaporation is utilized for the transfer of heat from the cooling zone.

Figure 9:
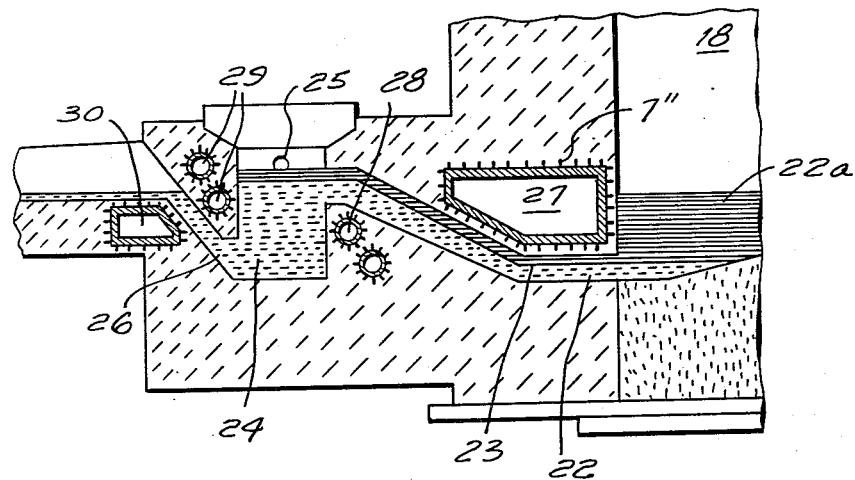
Fig. 9 is a view in section of a cooling arrangement for a portion of a shaft furnace.

The connection of the cooling system to additional cooling elements or other parts of the installation to be cooled is illustrated in Fig. 9 which shows its application to a tapping device for a cupola. In the lower part of the cupola shaft 18 the molten iron 22 collects with the slag 22a above it. Iron and slag are continuously removed through channel 23 and pass together into siphon 24 where the iron is finally separated from the slag. The slag 22a is removed through the opening 25, while the iron 22 flows off through the passage 26. The tapping opening from the cupola is protected in the embodiment shown in Fig. 9 by a cooling chamber 27 which is provided on the outside with studs 7" in order to improve the connection with the lining of the furnace and to assist the removal of heat from the brickwork. Tubular cooling elements of various cross sections depending on the purpose in mind could be used instead of the chamber 27. Similarly, cooling tubes 28, 29 and 30 can be arranged at the portions around siphon 24 which are liable to damage due to uncontrolled temperature.

It will be understood that each of the elements described above, or two or more together, may also find a useful application in other types of heating apparatus differing from the types described above. While the invention has been illustrated and described as embodied in a cupola furnace, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as now and desired to be secured by Letters Patent is:

1. Temperature control apparatus for furnaces comprising, in combination, a cylindrical furnace wall portion having an inner surface; cooling means comprising a plurality of tubular members in said furnace wall portion extending circumferentially along the inner surface thereof, said tubular members of said cooling means being adapted to contain cooling fluid to which the heat of said furnace wall portion is transferred, each tubular member having a flow passage through which cooling fluid is adapted to pass; constricting means in each tubular member for narrowing the flow passage therein for accelerating the flow of cooling fluid therethrough; conduit means for conducting cooling fluid to and from said cooling means; and regulating means for circulating cooling fluid through said cooling means via said conduit means with the cooling fluid at a predetermined pressure for maintaining the cooling fluid in the cooling means at a predetermined temperature, said regulating means including closure means in said conduit means for controlling the flow of cooling fluid through said cooling means, container means connected to said conduit means for receiving and evaporating the cooling fluid which has passed through said cooling means, pump means in said conduit means and valve means associated with said container means adjustable for regulating the pressure of the cooling fluid in said cooling means.

2. A method of regulating the wall temperature in a melting zone of a cupola furnace, comprising the step of circulating a cooling liquid through a cooling means in the furnace wall in the region of the melting zone of the furnace while subjecting the cooling liquid to a constant pressure which will maintain the cooling liquid at a constant temperature below the temperature of the furnace wall in the region of the melting zone so that the heat emanating from the melting zone of the furnace vaporizes at least a part of the cooling liquid without raising the temperature thereof, whereby the temperature of the cooling liquid and consequently the temperature of the furnace wall in the region of the melting zone may be regulated by regulating the constant pressure to which the cooling liquid is subjected.

3. A method of regulating the wall temperature in a melting zone of a cupola furnace, comprising the step of circulating a cooling liquid through a cooling means in the furnace wall in the region of the melting zone of the furnace while subjecting the cooling liquid to a constant superatmospheric pressure substantially above atmospheric pressure which will maintain the cooling liquid at a constant temperature substantially above the boiling point of the cooling liquid at atmospheric pressure but below the temperature of the furnace wall in the region of the melting zone so that the heat emanating from the melting zone of the furnace vaporizes at least a part of the cooling liquid without raising the temperature thereof, whereby the temperature of the cooling liquid and consequently the temperature of the furnace wall in the region of the melting zone may be regulated by regulating the constant pressure to which the cooling liquid is subjected.

4. A method of regulating the wall temperature in a melting zone of a cupola furnace, comprising the step of circulating a cooling liquid consisting of a metallic substance having a low melting point through a cooling means in the furnace wall in the region of the melting zone of the furnace while subjecting the cooling liquid to a constant superatmospheric pressure substantially above atmospheric pressure which will maintain the cooling liquid at a constant temperature substantially above the boiling point of the cooling liquid at atmospheric pressure but below the temperature of the furnace wall in the region of the melting zone so that the heat emanating from the melting zone of the furnace vaporizes at least a part of the cooling liquid without raising the temperature thereof, whereby the temperature of the cooling liquid and consequently the temperature of the furnace wall in the region of the melting zone may be regulated by regulating the constant pressure to which the cooling liquid is subjected.

5. A method of regulating the wall temperature in a melting zone of a cupola furnace, comprising the step of circulating water through a cooling means in the furnace wall in the region of the melting zone of the furnace while subjecting the water to a constant superatmospheric pressure substantially above atmospheric pressure which will maintain the water at a constant temperature substantially above the boiling point of the water at atmospheric pressure but below the temperature of the furnace wall in the region of the melting zone so that the heat emanating from the melting zone of the furnace vaporizes at least a part of the water without raising the temperature thereof, whereby the temperature of the water and consequently the temperature of the furnace wall in the region of the melting zone may be regulated by regulating the constant pressure to which the water is subjected.

6. In a temperature control apparatus for furnaces comprising, in combination, a furnace wall portion having an inner surface; conduit means arranged in the region of said inner surface of said furnace wall portion and adapted to contain a fluid coolant to which heat of said furnace wall portion is transferred; and means for maintaining the pressure within said conduit means at a predetermined substantially constant pressure at which a fluid coolant in said conduit means, while in liquid form, will be at least partly vaporized isothermally at a temperature below that of said furnace wall portion.

7. A temperature control apparatus for furnaces comprising, in combination, a furnace wall portion having an inner surface; conduit means arranged in the region of said inner surface of said furnace wall portion and adapted to contain a fluid coolant to which heat of said furnace wall portion is transferred; means for supplying additional liquid coolant to said conduit means; and means for maintaining the pressure within said conduit means at a predetermined superatmospheric substantially constant pressure at which a fluid coolant in said conduit means, while in liquid form, will be at least partly vaporized isothermally at a temperature below that of said furnace wall portion.

8. A temperature control apparatus for furnaces comprising, in combination, a furnace wall portion having an inner surface; conduit means arranged in the region of said inner surface of said furnace wall portion and adapted to contain a fluid coolant to which heat of said furnace wall portion is transferred; means for supplying additional liquid coolant to said conduit means; and means for maintaining the pressure within said conduit means at a predetermined superatmospheric substantially constant pressure at which a fluid coolant in said conduit means, while in liquid form, will be at least partly vaporized isothermally at a temperature below that of said furnace wall portion, said last-mentioned means being in the form of a check-valve placing the interior of said conduit means in communication with the exterior thereof.

References Cited in the file of this patent

UNITED STATES PATENTS

| | | |
|---|---|---|
| 721,417 | Berg | Feb. 24, 1903 |
| 1,702,058 | Murray | Feb. 12, 1929 |
| 2,181,927 | Townsend | Dec. 5, 1939 |
| 2,238,036 | Clutts | April 15, 1941 |
| 2,617,758 | Massiot | Nov. 11, 1952 |
| 2,671,658 | Moore | Mar. 9, 1954 |

FOREIGN PATENTS

| | | |
|---|---|---|
| 151,874 | Great Britain | Oct. 7, 1920 |
| 344,320 | Great Britain | Mar. 5, 1931 |
| 271,465 | Germany | Mar. 13, 1914 |